United States Patent
Hashimoto et al.

(10) Patent No.: US 6,383,627 B2
(45) Date of Patent: May 7, 2002

(54) HEAT-SHRINKABLE POLYESTER FILMS

(75) Inventors: Masatoshi Hashimoto; Tetsuya Anami; Norimi Tabota; Hiroshi Nagano, all of Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/828,786

(22) Filed: Apr. 10, 2001

(51) Int. Cl.⁷ .................................................. B32B 5/16
(52) U.S. Cl. ..................... 428/332; 428/333; 428/338; 428/339; 428/346; 428/347; 428/480
(58) Field of Search ................................. 428/480, 332, 428/333, 338, 339, 346, 347

(56) References Cited

U.S. PATENT DOCUMENTS 5,834,077 A  * 11/1998  Babrowicz ................. 428/34.9

* cited by examiner

Primary Examiner—Samuel A. Acquah
(74) Attorney, Agent, or Firm—Morrison & Foerster LLP

(57) ABSTRACT

Heat-shrinkable polyester films which exhibit a total light transmittance of 80% to 90% and a haze of 15% to 60%, both in a thickness of 50 μm and further exhibit a 45-degrees specular gloss of 70% or lower, so that they have frosted glass appearances without being printed or processed. Heat-shrinkable polyester films which exhibit a light transmittance of 0% to 20% at a wavelength of 380 nm and of 0% to 60% at a wavelength of 400 nm and further exhibit a haze of 15% or lower, so that they can prevent the contents of a vessel fitted therewith from being deteriorated by ultraviolet light and they have good shrinkage finish and particularly cause only rare occurrence of wrinkles, shrinkage spots, or other defects. These films are suitable for labels, particularly for labels of great product value.

10 Claims, No Drawings

HEAT-SHRINKABLE POLYESTER FILMS

FILED OF INVENTION

The present invention relates to, heat-shrinkable polyester films and more particularly to heat-shrinkable polyester films which have frosted glass like appearances without being printed or processed and to heat-shrinkable polyester films which can prevent the contents of a vessel fitted therewith from being deteriorated by ultraviolet light and have good shrinkage finish and particularly cause only rare occurrence of wrinkles, shrinkage spots, or other defects. These films are suitable for labels, particularly for labels of great product value.

BACKGROUND OF THE INVENTION

Frosted glass bottles have been mainly used as sake bottles for gifts, but their use has been unavoidably reduced in the recent movement toward the recycling of bottles. Frosted glass bottles have been therefore replaced by transparent glass bottles fitted with labels made of heat-shrinkable films. For these labels, heat-shrinkable films made of thermoplastic resins such as polyvinyl chloride and polystyrene have been mainly used; in recent years, however, serious problems have been indicated that, for example, chlorine-containing gases will be evolved in the incineration of polyvinyl chloride for disposal and printing is difficult on polystyrene. Therefore, heat-shrinkable polyester films have attracted considerable attention. The conventional heat-shrinkable polyester films have been finished to have frosted glass like appearances by printing or processing, which are, however, unfavorable to industrial use because of their high cost and long delivery time.

For heat-shrinkable films used as labels, particularly on the barrel of bottles, those films made of thermoplastic resins such as polyvinyl chloride and polystyrene have been mainly used; however, as described above, serious problems have been indicated that, for example, chlorine-containing gases will be evolved in the incineration of polyvinyl chloride for disposal and printing is difficult on polystyrene. Further, in the recycling of PET bottles, labels made of thermoplastic resins other than PET should be separated from the PET bottles. Therefore, heat-shrinkable polyester films have also attracted considerable attention as those which can solve such problem.

In recent years, the case has been increasing where heat-shrinkable labels are used for the purpose of protecting the content of a vessel fitted therewith from being deteriorated by ultraviolet light. The ultraviolet light cut type heat-shrinkable films made of polyvinyl chloride have been used so far; however, for the above reason, there has been a great demand for ultra-violet light cut type heat-shrinkable films made of other materials. The specific cut properties may vary depending upon the contents of a vessel fitted with these films. In the case of food or beverage, cut properties in the long wavelength region, particularly at 380 nm and at 400 nm, are important because the contents will cause a change in quality or will become colored by ultraviolet light in the long wavelength region, i.e., at wavelengths of 360 to 400 nm.

The conventional heat-shrinkable polyester films, however, have no ultraviolet light cut properties in the above long wavelength region.

SUMMARY OF THE INVENTION

Under these circumstances, the present inventors have intensively studied to solve the above-described problems in the prior art and to develop heat-shrinkable polyester films having frosted glass like appearances and heat-shrinkable polyester films having ultraviolet light cut properties in the long wavelength region. As a result, they have found that this purpose can be attained by the control of total light transmittance, haze and 45-degrees specular gloss, and by the control of light transmittance at specific wave-lengths and haze, respectively, thereby completing the present invention.

Thus the present invention provides a heat-shrinkable polyester film, which exhibits a total light transmittance of 80% to 90% and a haze of 15% to 60%, both in a thickness of 50 $\mu$m, and further exhibits a 45-degrees specular gloss of 70% or lower (also referred to hereinafter as the first heat-shrinkable polyester film(s) of the present invention).

The present invention further provides a heat-shrinkable polyester film, which exhibits a light transmittance of 0% to 20% at a wavelength of 380 nm and of 0% to 60% at a wavelength of 400 nm, and further exhibits a haze of 15% or lower (also referred to hereinafter as the second heat-shrinkable polyester film(s) of the present invention).

DETAILED DESCRIPTION OF THE INVENTION

The following will describe the first heat-shrinkable polyester films of the present invention, which have frosted glass like appearances without being printed or processed.

The first heat-shrinkable polyester films of the present invention may preferably be prepared from polyester compositions containing polyesters, which are composed of dicarboxylic acid components and diol components, and polyester elastomers.

For the dicarboxylic acid components in the polyesters, conventional dicarboxylic acids can be used alone or in combination, including aromatic dicarboxylic acids such as terephthalic acid, isophthalic acid and naphthalenedicarboxylic acid; aliphatic dicarboxylic acids such as adipic acid, sebacic acid and decanedicarboxylic acid; and alicyclic dicarboxylic acids. For the diol components in the polyesters, conventional diols can be used alone or in combination, including ethylene glycol, propylene glycol, triethylene glycol, butylene glycol, diethylene glycol, neopentyl glycol, 1,4-cylcohexanedimethanol, and ethylene oxide adducts of tetramethylene glycol.

The polyester elastomers used in the present invention refer to polyester block copolymers composed of high melting point crystalline polyester segments (hard segments) and low melting point soft polymer segments (soft segments) having molecular weights of 400 or higher. Polyester elastomers containing polylactones (e.g., poly-$\epsilon$-caprolactone) as the soft segments are particularly preferred.

The polyester compositions as the base material may further contain, if necessary, additives such as stabilizers, colorants, antioxidants and anti-static agents.

The present inventors have found that frosted glass like appearances can be rendered to films by the formation of undulation or large projections on their surface. More particularly, the gloss of films can be removed by the formation of projections on their surface, which are in size equal to or larger than a certain constant value depending upon the kind of lubricating fine particles. For example, the gloss of films can be controlled by adjusting the size of projections on their surface with lubricating fine particles made of an inorganic or organic compound, having an average particle diameter of 2 to 15 $\mu$m, in an amount of 0.1 to 10 wt %, preferably 0.5 to 5 wt %.

The present inventors have also found that the transparency of films can be obtained by optimizing the size and shape of lubricating fine particles. More particularly, lubricating fine particles larger in average particle diameter have a tendency to make a further improvement in the transparency of films containing the same amount of lubricating fine particles, although the reason for such tendency is not clear.

The lubricating fine particles used for rendering frosted glass like appearances may include conventional inert foreign particles such as those made of kaolin, clay, calcium carbonate, silicon dioxide, calcium terephthalate, aluminum oxide, titanium oxide, calcium phosphate or carbon black; and internal particles made of high melting point organic compounds insoluble in the film formation from molten polyester resins, or cross-linked polymers, or formed in the polyesters by metal compound catalysts used in the polyester polymerization. In particular, spherical particles of cross-linked polymers may preferably be used because the gloss and transparency of films can be obtained at the same time.

The present inventors have employed the total light transmittance, haze, and 45-degrees specular gloss of films as the indices of their gloss and transparency, and examined a relationship between these indices and frosted glass like appearances. As a result, the present inventors have found that frosted glass like appearances can be obtained when heat-shrinkable polyester films exhibit a total light transmittance of 80% to 90% and a haze of 15% to 60%, both in a thickness of 50 $\mu$m, and further exhibit a 45-degrees specular gloss of 70% or lower.

In other words the first heat-shrinkable polyester films of the present invention should exhibit a total light transmittance of 80% to 90% and a haze of 15% to 60%, both in a thickness of 50 $\mu$m, and further exhibit a 45-degrees specular gloss of 70% or lower.

The first heat-shrinkable polyester films of the present invention may preferably exhibit surface roughness as determined both by a maximum height ($SR_{max}$) of 2.0 $\mu$m or higher and by a center-plane average roughness ($SR_a$) of 0.20 $\mu$m or higher.

The first heat-shrinkable polyester films of the present invention may preferably have a heat shrinkability of 50% or higher, more preferably 50% to 75%, in the main shrinkage direction of the film after treatment in hot water at 95° C. for 10 seconds. If the films have a heat shrinkability of lower than 50%, labels made of such films cause insufficient shrinkage at the necks of bottles. In contrast, if the films have a heat shrinkability of higher than 75%, labels made of such films cause jumping when passing through a shrink tunnel because of their high heat shrinkability.

The first heat-shrinkable polyester films of the present invention may preferably have a heat shrinkability of 0% to 10%, more preferably 1% to 7%, in a direction perpendicular to the main shrinkage direction of the film after treatment in hot water at 95° C. for 10 seconds. If the films have a heat shrinkability of lower than 0%, the films can elongates in that direction, and labels made of such films are difficult to remove transverse wrinkles which have been formed during the shrinkage. In contrast, if the films have a heat shrinkability of higher than 10%, labels made of such films cause larger longitudinal shrinkage to make an increase in the amount of films used, resulting in the occurrence of an economical problem.

The first heat-shrinkable polyester films of the present invention may preferably have a glass transition temperature (Tg) of 50° C. to 90° C., more preferably 55° C. to 85° C., and most preferably 55° C. to 80° C. If the films have a glass transition temperature of higher than 90° C., labels made of such films exhibit insufficient shrinkage at low temperatures for satisfactory shrinkage finish. In contrast, if the films have a glass transition temperature of lower than 50° C., labels made of such films exhibit large spontaneous shrinkage unsuitable for practical use.

The first heat-shrinkable polyester films of the present invention may preferably have solvent bonding properties with 1,3-dioxolane.

The first heat-shrinkable polyester films of the present invention can be prepared, for example, by the following method.

A polyester composition containing the appropriate amounts of polyester(s) and polyester elastomer(s), and if necessary, lubricating fine particles and other additive(s) is dried with a hopper dryer, paddhe dryer, vacuum dryer, or any other conventional dryer, and then extruded at a temperature of 200° C. to 320° C. In the extrusion, any of the conventional methods may be used, including T-die method and tubular method.

The extrusion and the subsequent rapid cooling give an unstretched film. In the T-die method, the use of what is called the electrostatic contact method is preferred for the rapid cooling because it gives a film which is less uneven in thickness.

The unstretched film thus obtained is subjected to uni- or bi-axial stretching so that the film finally obtained meets the claimed requirements of the present invention.

The method of stretching may include uniaxial stretching with rolls only in the machine direction (MD), uniaxial stretching with a tenter only in the transverse direction (TD), and conventional biaxial stretching at stretch ratios set higher in the machine or transverse direction and set as low in the other direction as possible. If necessary, the film thus stretched may be subjected to further stretching.

In the above step of stretching, the film is stretched at a stretch ratio of at least 2.0, preferably at least 2.5, in the main shrinkage direction, and if necessary, further stretched in a direction perpendicular to the main shrinkage direction, followed by heat treatment.

The heat treatment is usually carried out in a fixed state under tension, during which relaxation or tentering at 20% or lower can also be carried out at the same time. The method of heat treatment can be any of the conventional methods including bringing the film into contact with heated rolls and holding the film with clips in a tenter.

Before, during, or after the above step of stretching, the film can also be subjected to corona discharge treatment on either or both sides to improve the bonding properties of the film against the print and/or adhesive layers.

Before, during, or after the above step of stretching, the film can also be coated with an additive(s) on either or both sides to improve the bonding, release, antistatic, self-lubricating, shading, or other properties.

The first heat-shrinkable polyester films of the present invention may preferably be 15 to 300 $\mu$m, more preferably 25 to 200 $\mu$m, in thickness.

The following will describe the second heat-shrinkable polyester films of the present invention, which can prevent the contents of a vessel fitted therewith from being deteriorated by ultraviolet light and have good shrinkage finish and particularly cause only rare occurrence of wrinkles, shrinkage spots, or other defects.

The second heat-shrinkable polyester films may preferably be prepared from polyesters having glass transition temperatures (Tg) adjusted to 60° C. to 75° C. by the incorporation of at least one $C_3$–$C_6$ diol (e.g., propanediol, butanediol, hexanediol).

The polyesters should neither contain $C_8$ or higher diols (e.g., octanediol), nor polyhydric diols (e.g., trimethylolpropane, trimethylolethane, glycerin, diglycerin), nor polycarboxlic acids (e.g., trimellitic acid, pyromellitic acid, their anhydrides). For heat-shrinkable polyester films obtained by the use of polyesters containing these diols or carboxylic acids, the desired high shrinkability cannot be attained.

When the polyesters contain aliphatic carboxylic acids (e.g., adipic acid, sebacic acid, decanedicarboxylic acid), their amounts in the polyesters may preferably be lower than 3 mol %. For heat-shrinkable polyester films obtained by the use of polyesters containing these aliphatic carboxylic acids in amounts of 3 mol % or greater, their film stiffness in the high-speed fitting is insufficient, which is not preferred.

The acid components, which are contained in the polyesters used in the present invention, may include terephthalic acid, isophthalic acid, and naphthalene dicarboxylic acid. The diol components may include, in addition to the above essential diols, ethylene glycol, neopentyl glycol, and 1,4-cylcohexanedimethanol. No incorporation of diethylene glycol, triethylene glycol, or polyethylene glycol in the polyesters is preferred. In particular, diethylene glycol may easily be formed as a by-product component in the polymerization of polyesters. The polyesters used in the present invention may preferably contain diethylene glycol in amounts of smaller than 4 mol %.

When two or more polyesters are used in admixture, the amounts of acid components and the amounts of diol components are relative to the total amount of all acid components and the total amount of all diol components, both of which are contained in these polyesters, independently of whether or not transesterification has been carried out after the mixing.

For the purpose of obtaining heat-shrinkable polyester films having particularly excellent shrinkage finish, neopentyl glycol may preferably be used as one of the diol components, more preferably in an amount of 16 wt % or greater.

The second heat-shrinkable polyester films of the present invention should exhibit a light transmittance of 0% to 20% at a wavelength of 380 nm and of 0% to 60% at a wavelength of 400 nm, and further exhibit a haze of 15% or lower.

The second heat-shrinkable polyester films of the present invention can be rendered ultraviolet light cut properties, for example, by the incorporation, application, or impregnation of an ultraviolet light cut agent. To attain a high degree of ultraviolet light cut properties, an ultraviolet light cut agent may preferably be incorporated in a film because the film can have a thick cut layer. The second heat-shrinkable polyester films of the present invention may preferably have at least two layers of laminated films. To prepare a label by bonding both ends of a film together with a solvent, the presence of an ultraviolet light cut agent in a great amount on the surface of the film is not preferred, and an ultraviolet light cut agent may preferably be contained only in the inner part of the film. For example, the second heat-shrinkable polyester films of the present invention may have at least three layers of laminated films and may contain an ultraviolet light cut agent in at least one internal layer not coming to the surface thereof.

The ultraviolet light cut agent may include those of the organic type, which can absorb ultraviolet light, and those of the inorganic type, which can block ultraviolet light. The ultraviolet light cut agent of the organic type is :exemplified by low molecular weight organic compounds, including those of the indole, benzotriazole, benzophenone, cyanoacrylate, or phenyl salycilate type. The amount of ultraviolet light cut agent to be used may preferably be in the range of 0.1 to 30 wt %.

The second heat-shrinkable polyester films of the present invention may be in the form of a single layer; however, when a low molecular weight organic compound is used as the ultraviolet light cut agent, there may occur the deterioration or sublimation of the ultraviolet light cut agent because of poor heat resistance or high temperature in the molten state of the polyester, so that sufficient ultraviolet light cut properties cannot be obtained.

To avoid this problem, the second heat-shrinkable polyester films of the present invention may preferably take the form of at least three layers of laminated films by co-extrusion, in which a layer containing no ultraviolet light cut agent is provided on each film surface. From the viewpoint of heat resistance as described above, ultraviolet light cut agents of the polymer type are preferred, specific examples of which may include Novapex U110 available from MITSUBISHI CHEMICAL CORPORATION. On the other hand, the ultraviolet light cut agents of the inorganic type may include inorganic particles having a average particle diameter below the wavelength range of visible light, specific examples of which may include fine particles of titanium oxide having an average particle diameter of 0.04 µm or smaller.

In the preparation of a polyester composition as the base material, one must come up with some ideas. For example, when an ultraviolet light cut agent is added to a polyester mixture and the polyester composition thus obtained is dried, one must pay attention to the drying temperature so that the ultraviolet light cut agent causes no sublimation. In the case where the polyester resin used as the base resin has a low glass transition temperature, drying at an ordinary temperature, e.g., at 120° C., causes sublimation of the ultraviolet light cut agent.

To improve the self-lubricating properties of the second heat-shrinkable polyester films of the present invention, inorganic or organic lubricants may preferably be added. The second heat-shrinkable polyester films of the present invention may further contain, when so required, additives such as stabilizers, colorants, antioxidants, defoamers, antistatic agents and ultraviolet light absorbers.

The second heat-shrinkable polyester films of the present invention may preferably have a heat shrinkability of 10% or higher, more preferably 10% to 50%, in the main shrinkage direction of the film after treatment in hot water 70° C. for 10 seconds. If the films have a heat shrinkability of lower than 10%, labels made of such films exhibit insufficient shrinkage at low temperatures, requiring the rise in temperature for shrinkage, which is not preferred. In contrast, if the films have a heat shrinkability of higher than 50%, labels made of such films cause jumping, which is also not preferred.

The second heat-shrinkable polyester films of the present invention may preferably have a heat shrinkability of 30% or higher, more preferably 75% to 95%, in the main shrinkage direction of the film after treatment in hot water at 85° C. for 5 seconds. If the films have a heat shrinkability of lower than 75%, labels made of such films cause insufficient shrinkage at the necks of bottles, which is not preferred. In contrast, if the films have a heat shrinkability of higher than 95%, labels made of such films have a possibility of causing jumping because of their still having shrinkability after the shrinkage, which is also not preferred.

The second heat-shrinkable polyester films of the present invention may preferably have a heat shrinkability of 10% or lower in a direction perpendicular to the main shrinkage direction of the film after treatment in hot water at 85° C. for 5 seconds.

It is important that the second heat-shrinkable polyester films of the present invention have a shrinkage stress of 1.0 kg/mm$^2$ or greater at 90° C. If the shrinkage stress is smaller than 1.0 lg/mm$^2$, the speed of shrinkage is too slow that labels made of such films cause possible occurrence of insufficient shrinkage at the necks of bottles. The second heat-shrinkable polyester films of the present invention may preferably have a shrinkage stress of 3.0 kg/mm$^2$ or smaller. If the shrinkage stress is greater than this value, such films cause possible deterioration of transparency by formation of voids around the ultraviolet light cut agents (and lubricants, if used) contained in the films.

It is also important that the second heat-shrinkable polyester films of the present invention have a compressive strength of 300 g or higher in the form of a label. The compressive strength, although it may be affected by the thickness of films, should be 300 g or higher from the viewpoint of suitability for high-speed machines. If the compressive strength is lower than 300 g, labels made of such films particularly cause possible occurrence of a failure in fitting on the bottles by label fitting machines.

The second heat-shrinkable polyester films of the present invention may preferably be, but are not particularly limited to, 10 to 200 μm, more preferably 20 to 100 μm, in thickness as the heat-shrinkable films for labels.

The second heat-shrinkable polyester films of the present invention may preferably have a thickness distribution of 6% or lower. If the films have a thickness distribution of higher than 6%, they cause the deviation of patterns in the superposition of many colors when processed in the multi-color printing, which is not preferred.

The second heat-shrinkable polyester films of the present invention can be prepared, for example, by the following method.

A polyester composition containing the appropriate amounts of polyiester(s), and if necessary, ultraviolet light cut agents and other additive(s) is dried with a hopper dryer, paddle dryer, vacuum dryer, or any other conventional dryer, and melt extruded into a film shape at a temperature of 200° C. to 300° C. In the extrusion, any of the conventional methods may be used, including T-die method and tubular method.

The extrusion and the subsequent rapid cooling give an unstretched film. In the case of a laminated film, polymers for the respective layers are formed one on top of another by lamination, or polymers for the respective layers are melted and co-extruded using separate extruders and then rapidly cooled by casting from the nozzles onto the rotating drum, to give an unstretched film.

The unstretched film thus obtained is subjected to stretching so that the film finally obtained meets the claimed requirements of the present invention. For attaining the purpose of the present invention, the transverse direction (i.e., the direction perpendicular to the direction of extrusion) is practical as the main shrinkage direction of the film; therefore, the following explanation is for an example of the film formation when the main shrinkage direction of the film is taken as the transverse direction. However, the film formation in which the main shrinkage direction of the film is taken as the machine direction (ie., the direction of extrusion) can also be carried out substantially in the same manner as described below, except that the direction of stretching is turned 90 degrees around the line perpendicular to the film surface.

In the present invention, the unstretched film should be stretched at a temperature of (Tg–5° C.) or higher but lower than (Tg+15° C.) where Tg is the glass transition temperature of the unstretched film. If the unstretched film is stretched at a temperature of lower than (Tg–50° C.), the second heat-shrinkable polyester film thus obtained is difficult to have heat shrinkability such as one of the claimed requirements of the present invention and it has deteriorated transparency, which is not preferred. If the unstretched film is stretched at a temperature of (Tg+15° C.) or higher, the second heat-shrinkable polyester film thus obtained exhibits insufficient film stiffness in the high-speed fitting and it has a remarkably deteriorated thickness distribution, which is also not preferred.

The method of stretching may include uniaxial stretching only in the transverse direction (TD) with a tenter, in which case the film can also be slightly stretched in the machine direction (MD). In such biaxial stretching, any of the sequential or simultaneous biaxial stretching method can be employed, and the film may further be stretched, if necessary, in the machine or transverse direction.

To make even thickness distribution in the second heat-shrinkable polyester films of the present invention, the unstretched film may preferably be heated to a prescribed film temperature at a low air flow rate with a heat transmission coefficient of 0.0013 cal/cm$^2$·sec·°C. (0.0054 J/cm$^2$·sec·K) or lower in the step of preheating to be carried out prior to the step of stretching when the unstretched film is stretched in the transverse direction with a tenter. The stretching in the transverse direction may preferably be carried out at a stretched ratio of 3.0 or higher, more preferably 3.5 or higher.

To prevent heat evolution in the films during stretching to reduce the unevenness of film temperature in the width direction of the films when the main shrinkage direction of the films (i.e., the direction of stretching) is taken as the transverse direction, the step of stretching may preferably be carried out at an air flow rate with a heat transmission coefficient of 0.0009 cal/cm$^2$·sec ·°C. (0.0038 J/cm$^2$·sec ·K) or higher, more preferably 0.0011 to 0.0017 cal cm$^2$·sec ·°C. (0.0046 to 0.0072 J/cm$^2$·sec ·K).

If the air flow rate employed in the step of preheating corresponds to a heat transmission coefficient of higher than 0.0013 cal/cm$^2$·sec ·°C. (0.0054 J/cm$^2$·sec ·K) or if the air flow rate employed in the step of stretching corresponds to a heat transmission coefficient of lower than 0.0009 cal/cm$^2$·sec ·°C. (0.0038 J/cm$^2$·sec ·K), the film thus obtained is difficult to have even thickness distribution, so that it causes the deviation of patterns in the super-position of many colors when processed in the multi-color printing, which is not preferred. More particularly, films having a thickness distribution of 6% or lower are easy to make superposition of many colors, for example, in the three-color printing to be carried out in the evaluation of shrinkage finish as described below. In contrast, films having a thickness distribution of higher than 6% are not preferred in the superposition of many colors.

The stretched film is then heat treated, if necessary, at a temperature of 70° C. to 100° C. to give a second heat-shrinkable polyester film of the present invention.

EXAMPLES

The present invention will hereinafter be further illustrated by some examples; however, the present invention is not limited to these examples.

The first heat-shrinkable polyester films of the present invention are exemplified in Examples 1, 2 and Comparative Example 1, while the second heat-shrinkable polyester films of the present invention are exemplified in Examples 3–9 and Comparative Examples 2–5.

The following will describe various testing methods for evaluation of heat-shrinkable polyester films prepared in these Examples and Comparative Examples.

(1) Total Light Transmittance and Haze

According to JIS K 7105, a film was measured for total light transmittance and haze with a hazemeter (an integrating sphere type light transmittance measuring apparatus), model NDH-1001DP, available from NIPPON DEN-SHOKU INDUSTRIES CO., LTD.

(2) Maximum Height and Center-plane Average Roughness

Using a three-dimensional microfigure measuring instrument, model ET-30HK, available from KOSAKA LABORATORY LTD, a film was measured for maximum height and center-plane average roughness under the conditions that the cut-off value was 80 μm and the driving speed was 100 μm/sec. The values of maximum height ($SR_{max}$) and center-plane average roughness ($SR_a$) were obtained by direct reading from the above instrument.

The maximum height ($SR_{max}$) is defined as the maximum height from the standard line, which is an average of the center lines (the area formed by the center line and the roughness curve of a sample above the center line is equal to the area formed by the center line and the roughness curve of the sample below the center line) obtained by scanning a constant area on the surface of a sample. The center-plane average roughness ($SR_a$) is defined as the three-dimensional average roughness for the center plane (the volume formed by the center plane and the surface profile of a sample above the center plane is equal to the volume formed by the center plane and the surface profile of the sample below the center plane) and expressed by the following formula:

$$SR_a = \frac{1}{L_x L_y} \int_0^{L_y} \int_0^{L_x} |f(x, y)| \, dx \, dy$$

wherein $SR_a$ is the center-plane average roughness, Lx and Ly are measuring lengths in the direction of x-axis and y-axis, respectively, on the surface of the sample, and f(x,y) is a roughness curved surface for the center plane.

(3) Heat Shrinkability

A film was cut into a square of 10 cm×10 cm with two sides parallel to the machine direction and to the transverse direction, respectively. This sample was heat-shrunk by immersion under no load in hot water at a prescribed temperature ±0.5° C. for a prescribed period of time and then measured for side lengths in the machine direction and in the transverse direction, respectively. The heat shrinkability was calculated from the measured values of side lengths by the following equation. The direction of either side corresponding to the larger value of heat shrinkability was referred to as the main shrinkage direction.

Heat shrinkability =

$$\frac{\text{Side length before shrinkage} - \text{Side length after shrinkage}}{\text{Side length before shrinkage}} \times 100(\%)$$

(4) Solvent Bonding Properties

A film was formed into a tube shape by bonding with 1,3-dioxolane, the circumference being 273 mm along the main shrinkage direction and the tube length being 100 mm along the direction perpendicular thereto, and the tube was cut in 15 mm width along the tube lengthwise direction. This sample was then drawn to cause the peeling of its bonded part in the direction perpendicular to the tube lengthwise direction, and evaluated to have good solvent bonding properties, when exhibited sufficient peeling resistance.

(6) Glass Transition Temperature (Tg)

Using a differential scanning calorimeter, model DSC220, available from SEIKO INSTRUMENTS & ELECTRONICS LIMITED, an unstretched film of 10 mg in weight was heated from −40° C. to 120° C. at a heating rate of 20° C./min. to draw a heat absorption curve, from which the glass transition temperature (Tg) was determined. Two tangent lines were drawn before and after the inflection point on the heat absorption curve, and the point of their intersection was regarded as the glass transition temperature (Tg).

(7) Ultraviolet Light Transmittance

A film was cut in a size of 38 mm×13 mm, and this sample was then measured for ultraviolet light transmittance at prescribed wavelengths with a double beam spectrophotometer, model U-2001, available from HITACHI, LTD.

(8) Thickness Distribution

A film was cut in a size of 5 cm×50 cm along the machine direction and along the transverse direction, respectively. This sample was measured for thickness (the number of measured points=20) with a contact thickness meter, model KG60/A, available from ANRITSU CORPORATION. For each sample, the thickness distribution (i.e., scattering of thickness) was calculated by the following formula. The measurement was repeated for fifty samples of each film and, the average value of thickness distribution was determined and evaluated on the following criteria:

Thickness distribution =

$$\frac{\text{Maximum thickness} - \text{Minimum thickness}}{\text{Agerage thcikness}} \times 100(\%)$$

Good: average value was 6% or lower;
Fair: average value was between 6% and 10%;
Poor: average value was 10% or higher.

The polyesters used in the examples and comparative examples were as follows:

Polyester A: polyethylene terephthalate (IV=0.75);
Polyester B: a polyester consisting of 100 mol % terephthalic acid, 70 mol % ethylene glycol and 30 mol % neopentyl glycol (IV=0.72);
Polyester C: a polyester elastomer consisting of 70 wt % polybutylene terephthalate and 30 wt % ε-caprolactone (reduced viscosity ($=_{sp/c}$)=1.30);

Polyester D: polybutylene terephthalate (IV=1.20).

The lubricating fine particles used in Examples 1,2 and Comparative Example 1 were as follows:

Lubricating Fine Particles A: EPOSTAR MA1010 (average particle diameter, 10 μm) available from NIPPON SHOKUBAI CO., LTD.

Lubricating Fine Particles B: EPOSTAR MA1006 (average particle diameter, 6 μm) available from NIPPON SHOKUBAI CO., LTD.

Lubricating Fine Particles C: Amorphous SYLOID (average particle diameter, 1.5 μm) available from FUJI SYLYSIA CHEMICAL LTD.

In the following Examples 1, 2 and Comparative Example 1, there will be illustrated some examples of the first heat-shrinkable polyester films of the present invention.

Example 1

A polyester composition containing 30 wt % polyester A, 49 wt % polyester B, 20 wt % polyester C, and 1 wt % polyester A was melt extruded from a T-die at 280° C. and rapidly cooled on chill rolls to give an unstretched film having a glass transition temperature (Tg) of 60° C.

The unstretched film was stretched in a tenter at a film temperature of 70° C. at a stretch ratio of 4.0 in the transverse direction to give a heat-shrinkable polyester film of 50 μm in thickness. The main shrinkage direction of the film was corresponding to the transverse direction.

Example 2 and Comparative Example 1

Heat-shrinkable polyester films of 50 μm in thickness were obtained in the same manner as described in Example 1, except that the kind and mixing ratio of lubricating fine particles were changed as shown in Table 1.

The heat-shrinkable polyester films prepared in Examples 1, 2 and Comparative Example 1 were evaluated by some of the testing methods as described above. The results are shown in Table 1.

In contrast, the heat-shrinkable polyester film of Comparative Example 1 had poor frosted glass like appearances, and it therefore had low quality and low practical availability.

According to the present invention, heat-shrinkable polyester films can be obtained, which have frosted glass like appearances without being printed or processed and further have sufficient solvent bonding properties, and they are therefore extremely useful as heat-shrinkable polyester films for labels, particularly for labels of great product value.

In the following Examples 3–9 and Comparative Examples 2–5, there will be illustrated some examples of the second heat-shrinkable polyester films of the present invention.

Example 3

A polyester composition was prepared by mixing 26 wt % polyester A, 50 wt % polyester B and 24 wt % polyester D, and adding 1 part by weight of an ultraviolet light cut agent (available from CIBA SPECIALTY CHEMICALS K.K.; trade name, Tinuvin 326), relative to 99 parts by weight of the polyester mixture. The polyester composition was subjected to melt co-extrusion from a T-die at 280° C., at which time a core layer and a skin layer were laminated together so that the ratio of skin/core layer thickness after stretching came to 25 μm/25 μm, followed by rapid cooling, to give an unstretched film having a glass transition temperature (Tg) of 70° C.

The unstretched film was then preheated until the film temperature came to 88° C. with a heat transmission coefficient of 0.0010 cal/cm$^2$·sec ·°C. 0.0042 J/cm$^2$·sec ·K), and stretched in a tenter at 78° C. at a stretch ratio of 3.9 in the transverse direction with a heat transmission coefficient of 0.0014 cal/cm$^2$·sec ·°C. (0.0059 J/cm$^2$·sec ·K), and heat treated at 76° C. for 10 seconds to give a heat-shrinkable polyester film of 50 μm in thickness. The main shrinkage direction of the film was corresponding to the transverse direction.

Examples 4–9 and Comparative Examples 2–5

Heat-shrinkable polyester films of 50 μm in thickness were obtained in the same manner as described in Example

TABLE 1

| | Base material Polyesters (wt %) | | | Lubricating fine particles (wt %) | | | Heat shrinkability 95° C., 10 sec. | | Total light transmittance (%) | Haze (%) | Gloss (%) | Surface roughness (μm) | | Solvent bonding properties |
| --- | --- | --- | --- | --- | --- | --- | --- | --- | --- | --- | --- | --- | --- | --- |
| | A | B | C | A | B | C | MD | TD | | | | SR$_{max}$ | SR$_a$ | |
| Example 1 | 30 | 49 | 20 | 1 | 0 | 0 | 2.5 | 59.0 | 84 | 36 | 70 | 8.1 | 0.29 | good |
| Example 2 | 30 | 49 | 20 | 0 | 1 | 0 | 3.0 | 63.0 | 85 | 40 | 68 | 5.1 | 0.26 | good |
| Comp. Ex. 1 | 31 | 49 | 20 | 0 | 0 | 0.04 | 3.0 | 63.0 | 95 | 4.5 | 161 | 0.6 | 0.05 | good |

Polyester A: TPA//EG = 100//100 (mol %)
Polyester B: TPA//EG/NPG = 100//70/30 (mol %)
Polyester C: a copolyester of (TPA//BD = 100//100)/ε-caprolactone = 70/30 (wt %)
Lubricating fine particle A: EPOSTAR MA1010
Lubricating fine particle B: EPOSTAR 1006
Lubricating fine particle C: Amorphous SYLOID
TPA: Terephthalic acid
EG: Ethylene glycol
NPG: Neopentyl glycol
BD: Butanediol As can be seen from Table 1, the heat-shrinkable polyester films of Examples 1 and 2 had good frosted glass like appearances. This indicates that the first heat-shrinkable polyester films of the present invention have high quality and high practical availability, and they are particularly suitable for heat-shrinkable labels having frosted glass like appearances.

3, except that the kind and amount of ultraviolet light cut agent contained in the core layer and/or the skin layer were changed as shown in Table 2.

The heat-shrinkable polyester films prepared in Examples 4–9 and Comparative Examples 2–5 were evaluated by some of the testing methods as described above. The results are shown in Table 2.

TABLE 2

| | Ultraviolet light cut agent | | Co-extrusion (ultraviolet light cut agent contd. or not) | | Ultraviolet light transmittance (%) | | Heat shrinkability (%) | | | | Thickness distribution | Haze (%) |
|---|---|---|---|---|---|---|---|---|---|---|---|---|
| | | Total amount in the film | | | | | 70° C. | 70° C. | 85° C. | 85° C. | | |
| | Product name*) | (wt %) | core layer | skin layer | 380 nm | 400 nm | MD | TD | MD | TD | | |
| Example 3 | Tinuvin 326 | 1.0 | contd. | contd. | 2 | 30 | 1.0 | 30.0 | 3.0 | 60.0 | good | 5.0 |
| Example 4 | Tinuvin 326 | 0.5 | contd. | contd. | 13 | 51 | 1.0 | 31.0 | 2.0 | 61.0 | good | 5.0 |
| Example 5 | Bonasorb UA-3901 | 0.5 | contd. | contd. | 1.3 | 0.5 | 1.5 | 32.0 | 2.5 | 61.0 | good | 4.9 |
| Example 6 | Novapex U110 | 30 | contd. | contd. | 0 | 52 | 1.0 | 30.0 | 1.5 | 49.0 | good | 5.5 |
| Example 7 | Tinuvin 326 | 1.3 | contd. | not contd. | 0 | 20 | 1.0 | 28.0 | 2.0 | 58.0 | good | 5.0 |
| Example 8 | Bonasorb UA-3901 | 0.5 | contd. | not contd. | 1 | 0.5 | 0.5 | 29.0 | 3.0 | 60.0 | good | 5.2 |
| Example 9 | Tinuvin 326/ Bonasorb UA-3901 | 0.5/0.1 | contd. | contd. | 6.3 | 18 | 1.0 | 30.0 | 2.0 | 61.0 | good | 5.2 |
| Comp. Ex. 2 | — | — | — | — | 81 | 82 | 1.0 | 31.0 | 2.0 | 62.0 | good | 5.0 |
| Comp. Ex. 3 | Tinuvin 326 | 0.1 | contd. | contd. | 63 | 78 | 1.0 | 31.0 | 2.5 | 61.0 | good | 5.0 |
| Comp. Ex. 4 | LA31 | 0.5 | contd. | contd. | 27 | 78 | 1.5 | 30.0 | 3.0 | 59.0 | good | 5.2 |
| Comp. Ex. 5 | $TiO_2$ | 5 | contd. | contd. | 0 | 0 | 1.0 | 30.0 | 2.5 | 59.0 | good | 89.5 |

*)Tinuvin 326 is available from CIBA SPECIALTY CHEMICALS K.K.; Bonasorb UA-3901 from ORIENT CHEMICAL INDUSTRIES LTD.; Novapex U110 from MITSUBISHI CHEMICAL CORPORATION; LA31 from ASAHI DENKA KOGYO K.K.; and $TiO_2$ is in the form of fine particles having an average particle diameter of 0.25 μm.

As can be seen from Table 2, the heat-shrinkable polyester films of Examples 3–7 had good ultraviolet light cut properties, good shrinkage finish, and good thickness distribution. This indicates that the second heat-shrinkable polyester films of the present invention have high quality and high practical availability, and they are particularly suitable for shrinkable labels.

In contrast, the heat-shrinkable polyester films of Comparative Examples 2–5 had insufficient ultraviolet light cut properties, and they therefore had low quality and low practical availability.

According to the present invention, heat-shrinkable polyester films can be obtained, which can prevent the contents of a vessel fitted therewith from being deteriorated by ultraviolet light and have good shrinkage finish and particularly cause only rare occurrence of wrinkles, shrinkage spots, or other defects, and they are therefore extremely useful as heat-shrinkable polyester films for labels, particularly for labels of great product value.

What is claimed is:

1. A heat-shrinkable polyester film, which exhibits a total light transmittance of 80% to 90% and a haze of 15% to 60%, both in a thickness of 50 μm, and further exhibits a 45-degrees specular gloss of 70% or lower.

2. The heat-shrinkable polyester film according to claim 1, which exhibits surface roughness as determined both by a maximum height ($SR_{max}$) of 2.0 μm or higher and by a center-plane average roughness ($SR_a$) of 0.20 μm or higher.

3. The heat-shrinkable polyester film according to claim 1, which has solvent bonding properties with 1,3-dioxolane.

4. The heat-shrinkable polyester film according to claim 1, which has a heat shrinkability after treatment in hot water at 95° C. for 10 seconds, of 50% or higher in a main shrinkage direction thereof and of 10% or lower in a direction perpendicular to the main shrinkage direction.

5. A heat-shrinkable polyester film, which exhibits a light transmittance of 0% to 20% at a wavelength of 380 nm and of 0% to 60% at a wavelength of 400 nm, and further exhibits a haze of 15% or lower.

6. The heat-shrinkable polyester film according to claim 5, which has a heat shrinkability after treatment in hot water 70° C. for 10 seconds, of 10% or higher in a main shrinkage direction thereof, and a heat shrinkability after treatment in hot water at 85° C. for 5 seconds, of 30% or higher in the main shrinkage direction and of 10% or lower in a direction perpendicular to the main shrinkage direction.

7. The heat-shrinkable polyester film according to claim 5, which has a thickness distribution of 6% or lower.

8. The heat-shrinkable polyester film according to claim 5, which comprises at least two layers of laminated films.

9. The heat-shrinkable polyester film according to claim 5, which contains an ultraviolet light cut agent.

10. The heat-shrinkable polyester film according to claim 5, which comprises at least three layers of laminated films and contains an ultraviolet light cut agent in at least one internal layer not coming to the surface thereof.

* * * * *

UNITED STATES PATENT AND TRADEMARK OFFICE
CERTIFICATE OF CORRECTION

PATENT NO. : 6,383,627 B2
DATED : May 7, 2002
INVENTOR(S) : Masatoshi Hashimoto et al.

It is certified that error appears in the above-identified patent and that said Letters Patent is hereby corrected as shown below:

<u>Title page,</u>
Item [30], Foreign Application Priority Data
Please add --   April 11, 2000   (JP)   2000-109428
                May 15, 2000    (JP)   2000-142182 --.

Signed and Sealed this

Fifteenth Day of October, 2002

Attest:

Attesting Officer

JAMES E. ROGAN
*Director of the United States Patent and Trademark Office*